United States Patent Office 3,179,884
Patented Apr. 20, 1965

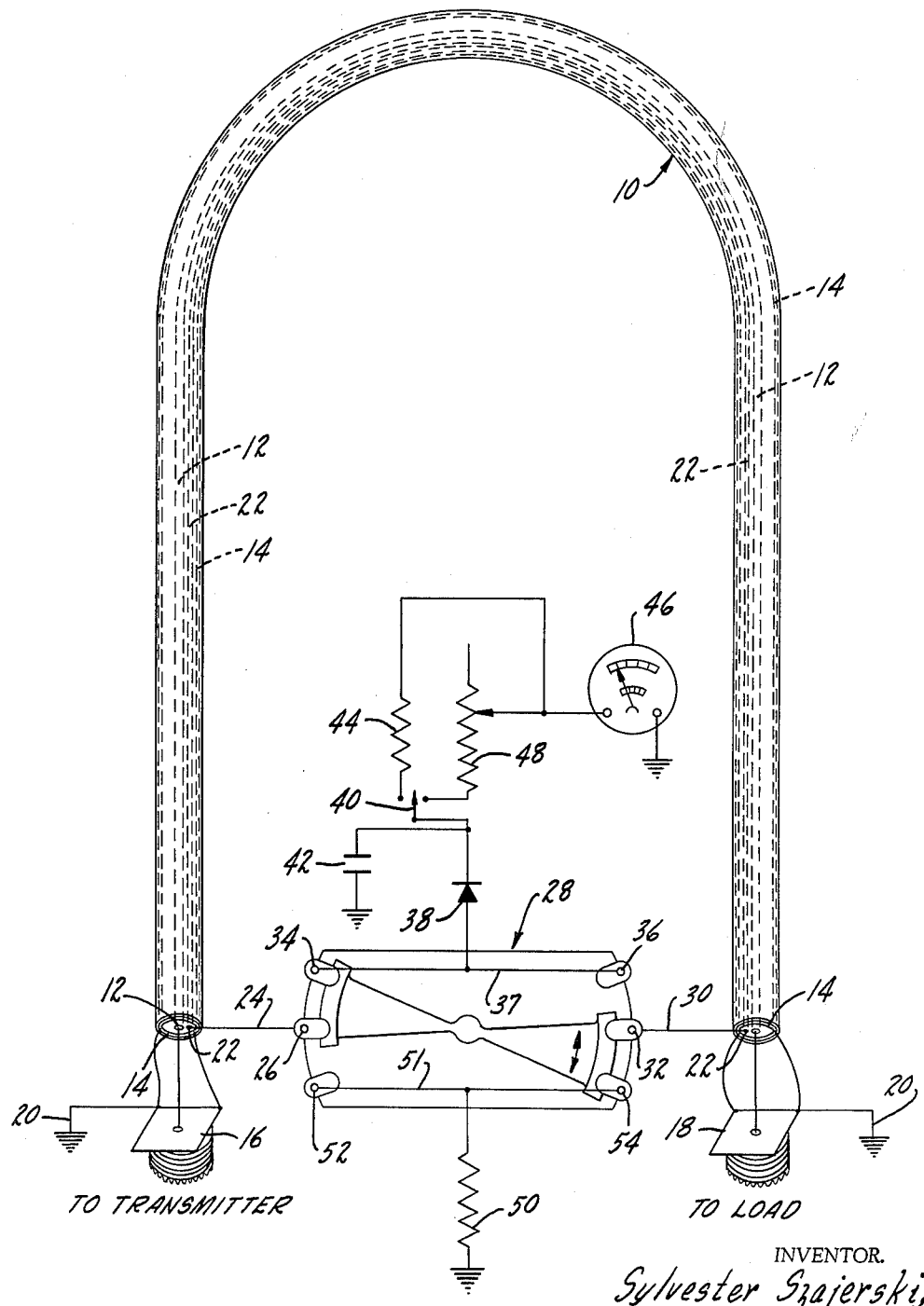

3,179,884
POWER METER FOR MEASURING REFLECTED AND ACTUAL POWER IN A HIGH FREQUENCY SYSTEM
Sylvester Szajerski, 8653 Saginaw Ave., Chicago 17, Ill.
Filed July 25, 1962, Ser. No. 212,379
3 Claims. (Cl. 324—95)

This invention relates to a power meter for use in measuring reflected and forward power in a transmission system.

A primary purpose is a power measuring device in which a single set of symmetrically arranged components is used to measure both reflected and forward power.

Another purpose is a power measuring bridge for use in measuring RF power in an antenna system.

Another purpose is a power measuring device of the type described which can be used to measure the actual power as well as the ratio between reflected and forward power.

Another purpose is a simple and efficient power meter suitable for use with ham radio equipment or the like.

Other purposes will appear in the ensuing specification, drawing and claims.

The invention is illustrated in the attached electrical diagram.

A coaxial cable 10 which includes the conventional center conductor 12 and an outer shield 14 formed of braided wire or the like, may by suitable connections, such as coaxial connectors, be connected to a transmitter and a load, for example an antenna. Normally the center conductor 12 will be connected at one end to a transmitter, for example by coaxial connector 16 and will be connected at the other end to the load, for example by coaxial connector 18. The shield 14 is grounded, as at 20.

Positioned between the center conductor 12 and the shield 14, and generally parallel to the center conductor, is a pickup loop or wire 22. The pickup loop is inserted within the coaxial cable and is both inductively and capacitively coupled to the center conductor of the cable. Preferably both the transmission line or coaxial cable 10 and the pickup loop 22 are shorter than a quarter wavelength in length. A pickup loop on the order of about one-tenth of a wavelength is desirable.

The transmitter end 24 of the pickup loop is connected to terminal 26 of a two-position switch indicated generally at 28. The opposite end 30 of the pickup loop 22 is connected to terminal 32 of the switch. Terminals 34 and 36 of the switch 28 are connected by wire 37 and a diode 38 is connected to wire 37 at its exact center to provide a symmetrical arrangement of components. The diode may be connected to a second switch 40 and a suitable capacitor 42 may be connected from the diode to ground.

One terminal of the switch 40 is connected to a fixed value resistor 44 which in turn is connected to a power meter 46. The other terminal of the switch 40 is connected to a variable resistor 48 which is also connected to the power meter 46. The resistor 44 may be used when it is desired to measure the actual value of power from the transmitter and resistor 48 is used to calibrate power meter 46 to read the ratio of reflected power to forward power.

A resistor 50 may be connected to ground and to the exact center of wire 51 connecting terminals 52 and 54 of switch 28. The value of resistor 50 is determined by the length of the pickup loop 22. It is important that resistor 50 be connected to the center of wire 51 to preserve the symmetrical arrangement of components.

The use, operation and function of the invention are as follows:

To read reflected power, the switch 28 is first moved to the position opposite that shown. Variable resistance 48 is put in the circuit by switch 40. The transmitter is turned on and the pickup loop will be connected in series with diode 38, resistance 50, resistance 48 and the power meter. Resistance 48 will be adjusted until meter 46 gives a full scale reading. Switch 28 will then be moved to the position shown and reflected power as a percentage of the forward power can be read on meter 46.

When switch 40 connects resistance 44 in circuit, the absolute or actual value of the power from the transmitter can be read on a second scale on the meter 46. The resistor 44 can be of a value such that actual power is available on the meter.

The invention should not be limited to a coaxial cable for the connection between the transmitter and the load. Various types of transmission lines, providing they are suitable for the frequency being used, are satisfactory. Open channels in which there is a central conductor are satisfactory.

The meter shown may be used to measure other than the power to an antenna. Any load may be placed at one side of the meter, and any source of power may be placed at the other. In other words, this meter can be used at any point in a transmission system to measure the forward power and reflected power at that point in the system.

A variation is to modify the switch 40 so that there are a plurality of resistors in parallel with resistor 44. Each of these resistors would be calibrated for use with a different frequency, for example the various frequencies utilized by ham radio operators. In this way the ham operator could measure the actual power at a variety of frequencies.

One of the principal advantages of the present invention is the accuracy of the readings. In prior power meters there was a separate set of components for measuring forward power and a separate set for use in reading reflected power. To obtain an accurate relationship between these two power readings, the components had to be perfectly matched. This is an expensive and difficult job. By utilizing the switch arrangement shown, a single set of components can be used in the measurement of both forward and reflected power. The components must be arranged symmetrically. Unless the resistance 50 and the diode 38 are connected at the exact centers of the wires 51 and 37, the impedances through the bridge will not be matched and true readings will not be obtained. In like manner the switch 28 must be symmetrically connected to the pickup loop with equal lengths of wire. The position of cable 10, the coaxial connectors and the switch must all be symmetrical.

Whereas the preferred form of the invention has been shown and described herein, it should be realized that there are many modifications, substitutions and alterations thereto, within the scope of the following claims.

I claim:

1. A device for measuring the forward power and reflected power at a point in a transmission system including a coaxial cable having a center conductor and a concentric shield, said cable being less than a quarter wavelength in length, means for connecting opposite ends of said cable into the transmission system, a pickup wire, generally the same length as said cable and positioned within said shield and parallel to said center conductor, a series circuit including a diode, resistance and a power meter, and a two-position switch for connecting said pickup wire in said series circuit, said switch having two groups of terminals with a plurality of terminals in each group, a first wire means connecting a terminal in one group with a terminal in the other group, a second wire means connecting a second terminal in said one group with a second terminal within said other group, said series circuit being connected between the center of said first wire means and the center of said second wire means so that the distance from the points of connection to each of the connected terminals is the same and so that the impedance in the series circuit is the same for both positions of the switch, a third terminal in said one group connected to one end of said pickup wire and a third terminal in said other group connected to the other end of said pickup wire, one position of the switch connecting the wire loop for a forward power reading and the other position connecting the wire for a reflected power reading.

2. The structure of claim 1 further characterized in that said resistance is variable so that the reflected power may be measured as a percentage of the forward power.

3. The structure of claim 2 further characterized by a second resistance in parallel with said variable resistance, and a second switch for selecting either said variable resistance or said second resistance.

References Cited by the Examiner

UNITED STATES PATENTS

| 2,545,544 | 3/51 | Doherty | 324—95 |
| 2,575,799 | 11/51 | Doherty | 324—95 |
| 2,797,387 | 6/57 | Adams | 324—95 |

FOREIGN PATENTS 625,378 6/49 Great Britain.

WALTER L. CARLSON, *Primary Examiner.*